April 3, 1928. 1,665,196
M. COLLIS
ELECTRICAL DOUGH IMPRINTING MACHINE
Filed April 29, 1926 5 Sheets-Sheet 1

WITNESSES
INVENTOR
Meyer Collis
BY
ATTORNEYS

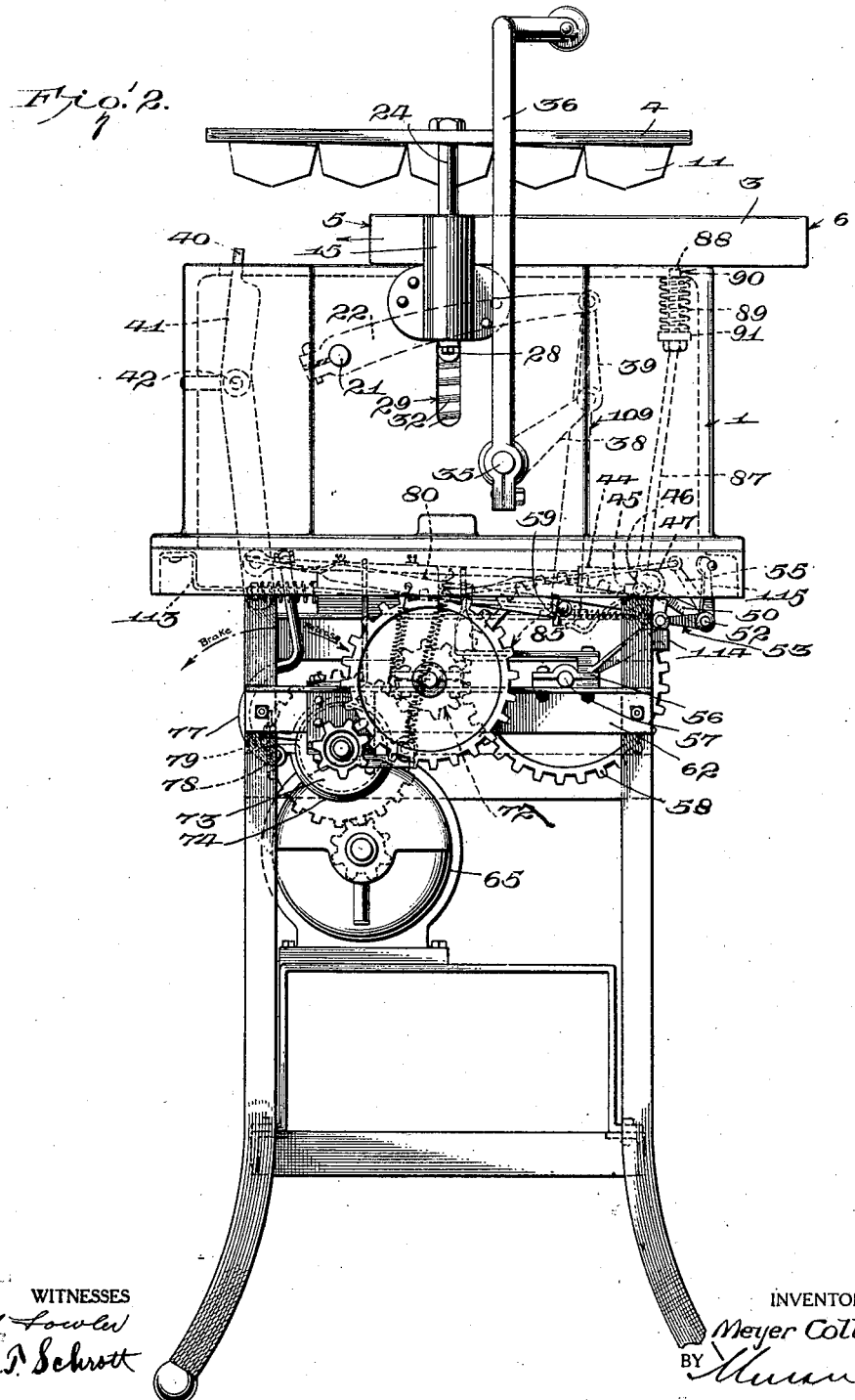

April 3, 1928.
M. COLLIS
1,665,196
ELECTRICAL DOUGH IMPRINTING MACHINE
Filed April 29, 1926 5 Sheets-Sheet 3
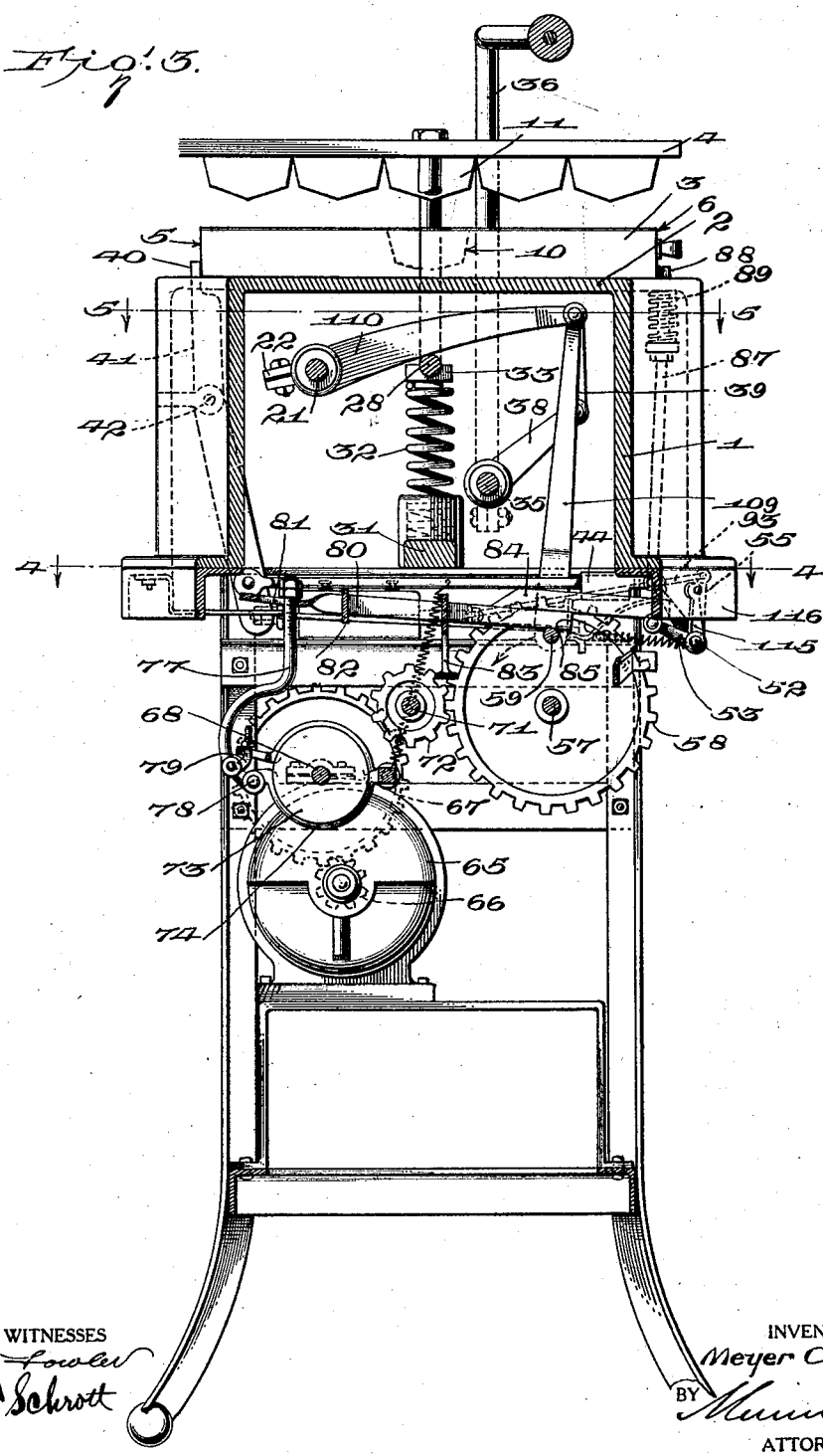
WITNESSES
INVENTOR
Meyer Collis
BY
ATTORNEYS

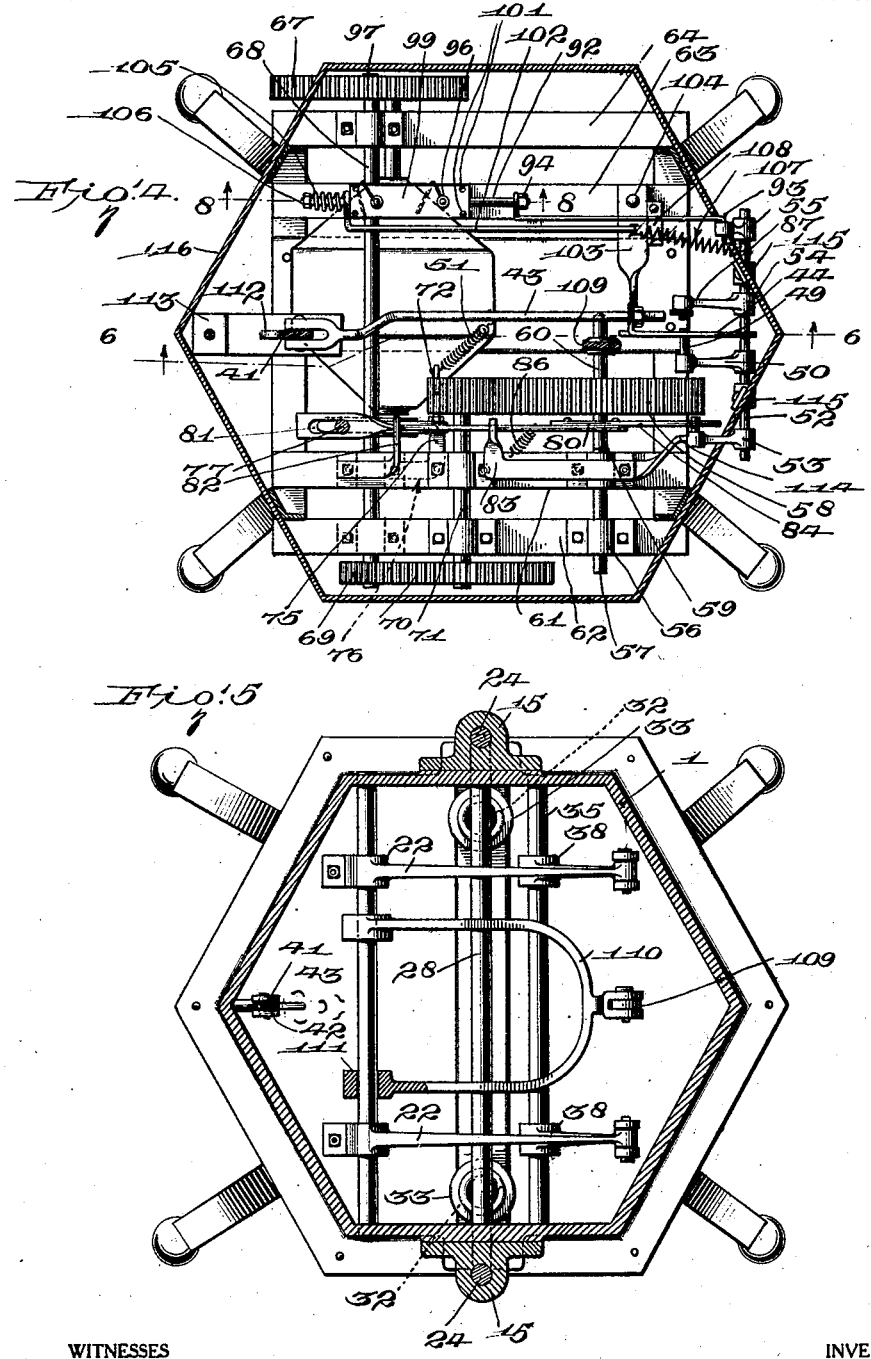

April 3, 1928.

M. COLLIS 1,665,196

ELECTRICAL DOUGH IMPRINTING MACHINE

Filed April 29, 1926     5 Sheets-Sheet 5

WITNESSES

INVENTOR
Meyer Collis
BY
ATTORNEYS

Patented Apr. 3, 1928.

1,665,196

UNITED STATES PATENT OFFICE.

MEYER COLLIS, OF CHARLESTON, SOUTH CAROLINA.

ELECTRICAL DOUGH-IMPRINTING MACHINE.

Application filed April 29, 1926. Serial No. 105,554.

This invention relates to improvements in apparatus for imprinting dough blanks prior to the baking operation, and an object thereof is to provide a machine by which the work is done through electrically operated mechanism thereby not only relieving much of the manual labor, but also facilitating the particular operation involved.

Other objects and advantages will appear in the following specification, reference being had to the accompanying drawings in which Figure 1 is a front elevation of the machine;

Figure 2 is a side elevation thereof, the parts being in the initial or starting position, the pan being shown as being moved beneath the presser head;

Figure 3 is a vertical section taken substantially on the line 3—3 of Fig. 1, the parts being in the operative position;

Figure 4 is a horizontal section taken on the line 4—4 of Figure 3 showing much of the mechanism which constitutes the improvement;

Figure 5 is a horizontal section taken on the line 5—5 of Figure 3 showing the mechanism of the upper part of the machine;

Figure 6 is a detail sectional view taken on the line 6—6 of Figure 4 showing the pan locking mechanism in the initial or starting position as in Figure 2;

Figure 7 is a similar sectional view showing the pan locking mechanism in the operative or locking position as in Figure 3;

Figure 8 is a detail longitudinal section on the line 8—8 of Figure 4 showing the construction of the electrical switch.

Figure 1:
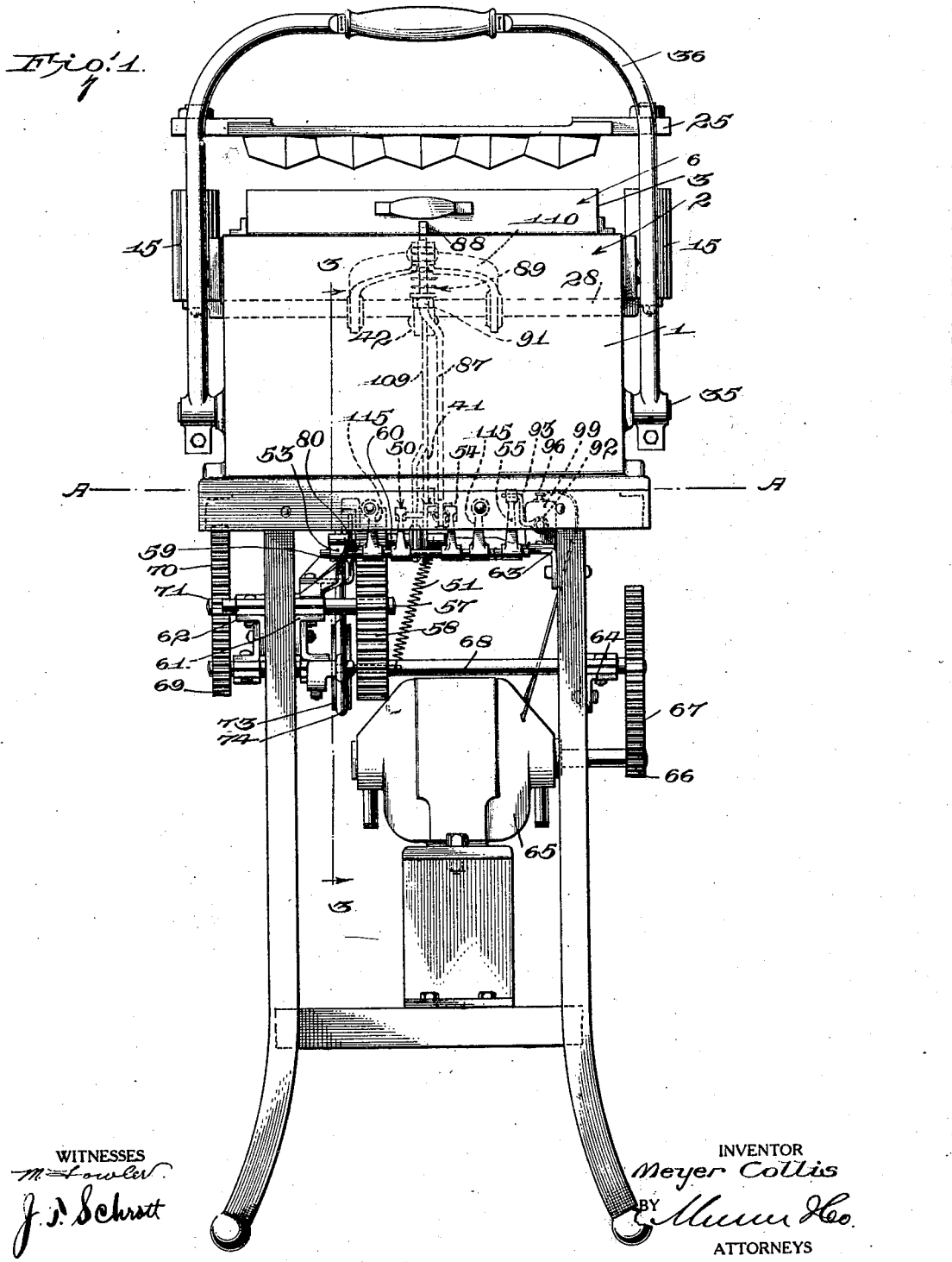

The foregoing brief statement of the object of the invention may be amplified by saying that the imprinting function of the machine as shown above the line A—A (Fig. 1) is performed by the electrical machine appearing below that line, and that the latter is subject to automatic control. The imprinting machine per se is fully disclosed in my prior Patent 1,551,088, granted August 25, 1925, and upon reference to that patent it is found that the imprinting machine is designed for manual operation. This mode of operation is retained in the present machine, acting as an emergency mode of operation in cases where the electric current fails, but the electrical apparatus is so combined with the imprinting machine that the former may function, without regard to or interference with any of the manual elements of the latter.

A condensed description of the patented imprinting machine will aid in the understanding of the improvement. The hollow base 1 has a top 2 upon which the pan 3 is slid in position beneath the presser head 4. The portion 5 of the pan or tray 3 is known as the back edge, while the portion 6 is known as the front edge. Lumps of dough are placed into the pocket 10 of the pan 3 to be impressed by the dies 11 when the presser head 4 is moved down.

Necessary down and up rectilinear movement of the presser head 4 is produced by downward and upward pressure upon the span rod 28 at the proper time. The ends of this rod extend through slots 29 in the end of the base 1 where they are suitably connected with the lower ends of carrier rods 24 which carry the presser head by means of brackets 25 and move in fixed guide tubes 15.

Downward pressure, in the case of the manually operated machine, is produced by the yoke or handle 36. The extremities of the yoke are secured to the protruding ends of a lever rod 35 which traverses the base 1. This rod has a pair of levers 38 (Fig. 5) each of which is connected with a corresponding crank 22 (Figs. 3 and 5) by means of a link 39. The cranks 22 are clamped upon a rod 21. They engage the span rod 28 as shown, and by tracing the connections it is easily seen that a downward pull upon the yoke 36 will produce downward pressure upon the span rod with a resulting lowering of the presser head 4 upon the pan 3.

Upward pressure is produced by a pair of springs 32. These tend to keep the presser head 4 in the normally raised position. The span rod 28 has lugs 33 with which the upper ends of the springs are engaged to prevent slipping off. The lower ends of the springs are seated upon a rest 31. The foregoing downward movement of the span rod 28 compresses the springs 32, and the tension thus stored in the springs returns the span bar and the presser head.

The improved machine has the electrically operated apparatus, appearing below the line AA (Fig. 1) by which the foregoing imprinting function is performed merely upon inserting the pan 3 in proper position beneath the presser head 4. The control of the electrical apparatus is automatic, and is accomplished in this manner: Engagement of the back edge 5 with the projecting end 40 upon insertion of the pan 3 in correct position below the presser head 4 rocks the iniating lever 41 upon its fulcrum 42 causing a sharp forward motion of the bar 43 connected at the lower end.

This bar extends forwardly of the machine where it carries a head 44 (Figs. 2, 4, 6 and 7). The construction of the head produces primary and secondary shoulders 45 and 46 and a curved tongue 47 which bends back in the direction of the shoulders and defines a channel or passage-way 48. The head 44 rests upon the pin 49 of an arm 50 which constitutes the forward support of the bar 43. A suitably mounted spring 51 has one end attached to the bar 43 tending to pull the bar backward and keeping the head in engagement with the pin 49.

A shaft 52 provides a common mounting for three arms 53, 54 and 55 in addition to the pin arm 50 already mentioned. These arms 53, etc. are known as the brake, latch, and switch arms by virtue of the devices with which they are associated. All are keyed upon the arm shaft 52, and the impact of the primary shoulder 45 with the pin 49 upon the foregoing sharp forward motion of the bar 43 imparts a clockwise turn to the arm shaft 52 producing a slight change in position as can be seen by comparing Figures 2 and 6 with Figures 3 and 7.

Mounted in bearings 56 (Fig. 4) is the shaft 57 of a gear 58 which, by virtue of having a double crank pin 59 and 60, is known as the crank gear. The bearings are carried by the cross pieces 61 and 62 of a framework which includes cross pieces 63 and 64 mentioned later. Operation of the crank gear 58 occurs only when the pan 3 is inserted preparatory to impressing the dough blanks. A full revolution of the gear 58 comprises one cycle of operation.

Power is derived from an electric motor 65 and an intermediate train of gearing which is as follows: The motor shaft carries a pinion 66 (Figs. 1 and 3) driving a large gear 67 on one end of a counter shaft 68. The bearings of this shaft are carried by the cross pieces 64, 61 and 62. The other end of the brake shaft carries a pinion 69 (Fig. 4) meshing with the large gear 70 of a countershaft 71. The bearings of this shaft are carried by the cross pieces 61 and 62. The inner end of the countershaft 71 carries a pinion 72 meshing with and driving the crank gear 58. Although the motor speed may be relatively high, the foregoing train of gearing reduces the speed to such extent that a revolution of the crank gear will be (and desirably so) relatively slow.

A drum 73 fixedly carried by the brake shaft 68, has a hinged band 74 applied to the periphery (Figs. 2 and 3). The hinge joint of the brake band is made in part by the pin 75 of a bracket 76 extending from the underside of the cross piece 61. The extension of this pin also serves as the foregoing mounting of the spring 51. The brake lever 77 is pivotally connected at 78 with the lower section of the brake band. The brake lever has a loose connection at 79 with the upper brake section. Motion of the lever 77 to the left (Fig. 3) applies the brake band while motion to the right releases the brake drum.

The upper end of the brake lever 77 has connection with a brake rod 80. The connection includes the slot 81 which permits relative movement. The brake rod is guided by a pair of brackets 82, 83. The rod has a portion 84 attached thereto in offset relationship (Figs. 3 and 4) producing a shoulder 85. A spring 86 pulls down upon the brake rod keeping the right free end in contact with the component 59 of the double crank pin.

A rod 87, connected at the lower end with the arm 54 (Figs. 4, 6 and 7) terminates in a latch 88 at the upper end serving the purpose of holding the pan 3 in true position for the imprinting operation of the presser head 4. A spring 89 tends to retract the latch in the opening 90 in the top 2 in which the latch operates. The spring presses against an enlargement 91 on the latch rod. The latch 88 assumes a depressed position in respect to the top 2 when the machine is in the initial position as in Figure 2. The pan 3 can therefore be slid beneath the presser head 4 without interference by the latch. The engagement of the pan with the initiating lever 41 produces several simultaneous acts, one of which is to release the brake drum 73, another to move the rod 87 upwardly thereby to project the latch (Figs. 3 and 7) and a third is to close the electrical switch and thereby start the motor 65.

For the latter purpose the switch arm 55 (Fig. 4) has connection with the switch rod 92 by means of a wire or other link 93. A pull of the switch rod to the right by engagement of the bent end of the link with the nut 94 threaded on the end of switch rod brings the movable contact 95 (Fig. 8) into engagement with a fixed contact 96 thereby establishing electrical connection between that contact and a second fixed contact 97. The contacts are introduced in the motor circuit in a well known manner, the actual wiring being omitted.

An insulating element 98 carries the movable contact 95. The cover 99 of the switch box is composed of insulation. The lower part 100 of the box is mounted upon the cross piece 63. The separability of the cover being necessary to the assembling of the switch, the same screws 101 that secure the cover upon the box also secure the entire switch upon the cross piece.

A second link 102 extends from the left end of the switch rod to an arm 103 which is pivoted to the cross piece 63 at 104. The bent end of the link 102 engages one end of the spring 105. The other end of the spring engages a nut 106 on the switch rod. Movement of the switch rod 92 to the right compresses the spring 105 against the bent end of the link 102. Ordinarily the expansion of the spring 105 when permitted, will move the switch rod to the left so as to disengage the contacts, but in case the switch should stick the engagement of the crank pin 60 with the free end of the arm 103 will bring additional pressure to bear against the spring and thus insure the opening of the switch. A spring 107 normally holds the arm 103 against a fixed stop 108. A connecting rod 109 joins the component 60 of the double crank pin with a yoke 110 (Figs. 1, 3 and 5) which is loosely mounted at 111 (Fig. 5) upon the crank rod 21. The yoke 110 bears upon the span rod 28 in the same manner as do the cranks 22, and the yoke is for the same purpose. The loose mounting at 111 will permit operation of the yoke 110 without affecting the span rod and its connection. The connecting rod is so located upon the crank pin that the extremity of the crank pin protrudes beyond the connecting rod thereby providing a portion to engage the pivoted arm 103 as already stated. Reverting briefly to the initiating lever 41, it is noted that the lower end operates in the slot 112 of a fixed bracket 113 which serves as a guide.

The operation.

Assume first that the machine is empty, in other words no pan 3 in place beneath the presser head 4. None of the parts involved are in motion when the machine is in this condition. The projecting end 40 of the lever 41 stands slightly forwardly of the slot of the top 2 in which it moves. The latch 88 is depressed in the opening 90 (Figs. 2 and 6) either level with or slightly below the surface of the top.

Insert the pan 3 (Fig. 2). The reader may imagine the pan as having numerous pockets 10 (Fig. 3) each of which contains a lump of dough of a size sufficient to make a biscuit. Reference may be had to the patent mentioned before for the details. The dies 11 correspond with the pockets, but the pan 3 must be inserted the proper distance so that accurate registration of pockets and dies may be had, otherwise the dies will not enter the pockets properly and cause damage to the edges of the latter.

Assume next that the pan 3 has been shoved to the proper position (Fig. 3) beneath the presser head 4. The back edge 5 shoves the projection 40 backward in doing so (Figs. 3 and 7) rocking the initiating lever 41 upon its fulcrum 42 and pushing the bar 43 (Figs. 4, 6 and 7) forwardly. In pushing the pan 3 in place the operator carries out a quick movement, due to the rapidity with which he naturally works, thereby imparting a sharp forward motion to the bar 43.

Normally the pin 49 (Figs. 4 and 6) conveniently known as the release pin, occupies such position in the passage 48 as to be opposite the primary shoulder 45. The foregoing sharp forward motion of the bar 43 will impart a sharp blow to the release pin 49, sending it upward until it assumes a position in front of the secondary shoulder 46. This action is accomplished by virtue of the fact that the occupancy of the release pin in the passage 48 is loose. The foregoing sharp blow and the continued forward motion of the bar 43 lifts the pin arm 50 from the position in Figure 6 to the position in Figure 7.

Inasmuch as the pin arm is fastened to the arm shaft 52 it follows that the various spring, latch and switch arms 53, 54 and 55 partake of the same angular motion. This motion causes the simultaneous performance of three actions. The upward motion of the arm 53 raises the shoulder 85 of the brake rod 80 above and out of engagement with the crank pin 59 permitting the relaxation of tension on the brake lever 77 and the consequent release of the brake drum 73 by the band 74. The upward motion of the arm 54 moves the rod 87 and latch 88 upwardly (Figs. 3 and 7) to project the latch in front of the edge 6 of the pan 3 thereby to hold the pan in firm position. The motion of the switch arm 55 pulls upon the link 93 (Fig. 4) drawing the switch rod 92 to the right (Fig. 8) and causing the movable contact 95 to bridge the fixed contacts 96 and 97 thereby to close the circuit of the motor 65.

Operation of the motor 65 puts the associated train of gearing in motion so that the crank gear 58 revolves. The crank gear makes one complete turn in the counterclockwise direction (Figs. 2 and 3). The double crank pin 59, 60 normally assumes the top center. The connecting rod 109, which is joined with the component 60 of the double crank pin, therefore reaches to the upper extremity of its range of motion, holding the loose yoke 110 high up and permitting the springs 32 to push the span rod 28 to the upper extremity of the slots 29 (Fig. 2). The presser head 4 which is connected with the span rod 28, therefore normally assumes the highest possible position in reference to the base 1. But, as stated, the starting of the motor 65 starts the crank gear 58 and the double crank pin on a cycle of operation.

The first 180° of movement of the double crank pin performs a complete downward stroke of the presser head 4 so that the dies 11 imprint a predetermined design on the dough blanks in the pockets 10 of the pan 3. From there on the double crank pin traverses its upward stroke, returning the presser head to the original position. The curved tongue 47 of the head 44 (Figs. 2, 6 and 7) extends into the path of the component 60 of the double crank pin. The crank pin will therefore come into engagement with the loop or bent extremity of the tongue and raise the bar 43 a very slight but sufficient distance (see dotted lines Fig. 7) to permit the release pin 49 to drop out of engagement with the secondary shoulder 46. The release pin traverses the passage 48, provision being made of a stop 114 (Figs. 2 and 4) to limit the turning motion of the shaft 52 due to the release of the pin 49.

This motion is assisted by the latch spring 89, and the effect is to turn the arm shaft 52 in the counter clockwise direction so that each of the various arms 53, 54 and 55 assumes the original position.

The brake arm 53 holds the brake rod 80 up no longer and the brake rod therefore lowers sufficiently to bring the shoulder 85 into the path of the now advancing wrist pin 59. As soon as the wrist pin engages the shoulder it pushes the brake rod 80 to the left, rocks the brake lever 77 to the left and tightens the band 74 upon the brake drum 73. The downward motion of the arm 54, assisted by the action of the spring 89, depresses the latch 88 so as to release the front edge 6 of the pan 3. The motion of the arm 55 releases the switch rod 92 thereby permitting the spring 105 to open the switch. Should the switch contact happen to stick and thereby prevent the desired opening of the motor circuit, the protruding end of the crank pin 60 will force said opening by coming in contact with the pivoted arm 103 and moving it over the left (Fig. 4) as it completes its movement and reassumes the top center of its circular path.

Upon removing the pan 3 the initiating lever 41 will swing to the original position (Figs. 2 and 6). This is accomplished by the spring 51. The release pin 49 is in position already, and the foregoing return of the initiating lever 41 with its connected bar 43 simply brings the primary shoulder 45 (Fig. 6) into the original relationship with the release pin in readiness for a repetition of the foregoing cycle of operation. In conclusion it may be noted that the arm shaft 52 is journaled in suitable bearings 115 which depend from the framework of the lower part of the machine. This framework includes a polygonal member 116 upon which the flanged base 1 rests.

While the construction and arrangement of the improved electrical dough imprinting machine is that of a generally preferred form, obviously modifications and changes may be made without departing from the spirit of the invention or the scope of the claims.

I claim:—

1. A machine of the character described comprising a pan having dough pockets and a presser head having dies; in combination, a movable yoke for advancing the presser head into an engaging position of the dies with dough blanks in said pockets, normally dormant mechanism by which the yoke is operable, and means actuated by engagement of a portion of the pan when in registering position with the presser head to put said mechanism in motion for operation of the yoke.

2. A machine of the character described comprising a presser head having dies, a pan insertible beneath the presser head having dough pockets registerable with the dies; in combination, means for so actuating the presser head as to impose the dies upon dough blanks in said pockets, normally dormant mechanism for operating said actuating means, and means situated in the path of the pan and being displaced by the pan when the foregoing registering position is reached to thereupon set said mechanism in motion to operate said actuating means.

3. A machine of the character described comprising a presser head having dies, a pan insertible beneath the presser head having dough pockets registerable with the dies; in combination, means for so actuating the presser head as to impose the dies upon dough blanks in said pockets, normally dormant mechanism for operating the actuating means, a normally depressed latch, and means situated in the path of the pan being displaced when the foregoing registering position is reached to simultaneously extend the latch into position to hold the pan and set said mechanism in motion for the operation of said actuating means.

4. A machine of the character described comprising a presser head having dies, a pan insertible beneath the presser head having dough pockets registerable with the dies; in combination, actuating means for advancing the presser head in the direction of the pan, mechanism for operating the actuating means, a latch normally depressed below the path of the pan, initiating means having a portion projecting into the path of one edge of the pan being engaged and displaced by said edge when registration of the dies and pockets is effected thereby to shift said initiating means, and means operated by the shifting movement of said initiating mechanism to extend the latch into locking position against another edge of the pan and to set the mechanism in motion for operating the actuating means.

5. A machine of the character described comprising a presser head having dies, a pan movable beneath the presser head having dough pockets registerable with the dies; in combination, rockable actuating means for advancing the presser head toward the pan to impose the dies upon dough blanks in the pockets, mechanism for rocking said actuating means, a latch which is normally depressed so that the pan may pass thereover during movement toward the foregoing registering position, a rockably mounted lever having a projection in the path of one portion of the pan being engaged by said portion during movement into said registering position and maintaining contact while the pan assumes said registering position to hold the lever in the resultingly shifted position upon said rockable mounting, and means which is actuated by the shifting movement of the lever to project the latch into locking position adjacent to another portion of the pan and setting the mechanism in motion for rocking said actuating means.

6. A machine of the character described comprising a base having a top, a presser head having dies, a pan movable between the top and presser head having dough pockets registerable with the dies; in combination, actuating mechanism rockable upon the base for advancing the presser head toward the top and the dies into imprinting position within the pockets, mechanism for operating the actuating means, a latch normally depressed below the surface of the top permitting the foregoing movement of the pan without obstruction, a lever rockably mounted upon the base having a portion projecting through the top into the path of a portion of the pan for engagement and displacement thereby as the pan advances to and assumes the foregoing registering position of the dies with the pockets, and means operated by the resulting shifting motion of the lever to extend the latch through the top into locking position adjacent to another portion of the pan and at the same time setting said mechanism in motion for operation of the actuating means.

7. A machine of the character described comprising a base having a top, a presser head having dies, a pan movable between the top and presser head having dough pockets registering with the dies; in combination, actuating mechanism rockable upon the base for advancing the presser head toward the top and the dies into imprinting position within the pockets, mechanism for operating the actuating means, a latch normally depressed below the surface of the top permitting the foregoing movement of the pan without obstruction, a lever rockably mounted upon the base having a portion projecting through the top into the path of a portion of the pan for engagement and displacement thereby as the pan advances to and assumes the foregoing registering position of the dies with the pockets, means operated by the resulting shifting motion of the lever to extend the latch through the top into locking position adjacent to another portion of the pan and set the mechanism in motion for producing one advance and retreat of the presser head through medium of said actuating means, and means coming into play near the end of a predetermined motion thereof in the operation of said mechanism for causing the depression of the latch preparatory to removal of the pan.

8. A machine of the character described comprising a presser head having dies, a pan movable beneath the presser head having dough pockets registerable with the dies; in combination, actuating means for advancing the presser head toward the pan, mechanism for operating the actuating means, a brake which is normally set to prevent coasting of moving parts of said mechanism while the presser head is in the disengaging position, and means which is operated upon engagement of the pan during movement of the same to the foregoing registering position to simultaneously release the brake and set said mechanism in motion for operation of said actuating means to engage the dies with dough blanks in said pockets.

9. A machine of the character described comprising a presser head having dies, a pan movable into position beneath the presser head having pockets registerable with the dies; in combination, actuating means for moving the presser head into engaging and disengaging position, an electric motor included in said mechanism, a controlling switch for the motor, a brake applied to part of said mechanism, said brake including a band and lever, and means operated by the pan as the pan assumes the foregoing registering position to move the lever to release the brake and at the same time move the switch to start the motor and set the mechanism in operation for moving the presser head into an engaging position by medium of said actuating means.

10. A machine of the character described comprising a presser head having dies, a pan movable into position beneath the presser head having pockets registerable with the dies; in combination, actuating means for moving the presser head into engaging and disengaging position, an electric motor included in said mechanism, a controlling switch for the motor, a brake applied to part of said mechanism, said brake including a band and lever, and means operated by the pan as the pan assumes the foregoing registering position to move the lever to release the brake and at the same time move the switch to start the motor and set the mechanism in operation for moving the presser head into an engaging position by medium of said actuating means, and means coming into play after predetermined movement of said mechanism to open the switch thereby stopping the motor and reversely shifting the lever to apply the brake band thereby preventing coasting of moving parts of the mechanism when the presser head again reaches the disengaging position.

11. A machine of the character described comprising a presser head having dies, a pan movable beneath the presser head having pockets registerable with the dies; in combination, actuating means for moving the presser head into engaging and disengaging position, a gear having a crank pin in connection with said actuating means, an electric motor for driving the gear to produce said engaging and disengaging movements, a switch controlling the motor, and means operated by the pan to close the switch and start the motor thereby driving the gear.

12. A machine of the character described comprising a presser head having dies, a pan movable beneath the presser head having pockets registerable with the dies; in combination, actuating means for moving the presser head into engaging and disengaging position, a gear having a crank pin in connection with said actuating means, an electric motor for driving the gear to produce said engaging and disengaging movements, a switch controlling the motor, means operated by the pan to close the switch and start the motor thereby driving the gear, and means operated by the crank pin when nearing the end of its motion at which time the presser head assumes the disengaging position to open the switch and stop the motor, thereby ceasing the driving of said gear.

13. A machine of the character described comprising a presser head having dies, a pan movable beneath the presser head having pockets registerable with the dies; in combination, actuating means for moving the presser head into engaging and disengaging position, a gear having a crank pin connection with said actuating means, an electric motor for driving the gear to produce said engaging and disengaging movements, a switch controlling the motor, means operated by the pan to close the switch and start the motor thereby driving the gear, means operated by the crank pin when nearing the end of its motion at which time the presser head assumes the disengaging position to open the switch and stop the motor, thereby ceasing the driving of said gear, and brake mechanism which is applied simultaneously with the stopping of the motor to prevent coasting of the gear and movement of the crank pin past the desired initial position.

14. A machine of the character described comprising a presser head having dies, a pan movable beneath the presser head having registerable dough pockets; in combination, actuating means for moving the presser head to engaging and disengaging position, a gear having a connecting rod joining said actuating means, a crank pin on the gear with which the rod is connected so as to leave a protruding portion, an electric motor for driving the gear, a switch controlling the motor, means operated by the pan upon movement into registering position for closing the switch and starting the motor thereby driving the gear and causing the crank pin to move the presser head into an engaging and then a disengaging position, and means in the path of said protruding end being engaged when the presser head nears the disengaging position to open the switch and stop the motor.

15. A machine of the character described comprising a presser head having dies, a pan movable into position beneath the presser head having registerable dough pockets; in combination, actuating means for moving the presser head into engaging and disengaging position, a gear having a crank pin in connection with said actuating means for the foregoing operation thereof, an electric motor for driving the gear, a switch controlling the motor, means operated upon a sharp impact of the pan in moving the pan into registering position to cause a closure of the switch and the starting of the motor, said means including an arm having a release pin and a bar with which the pin assumes a holding position, and means extending from the bar into the path of the crank pin for engagement thereby when the crank pin nears the end of prearranged movement to displace the bar and release the pin permitting opening of the switch and stopping of the motor.

16. A machine of the character described comprising a presser head having dies, a pan movable beneath the presser head having registerable dough pockets; in combination, actuating means for moving the presser head into engaging and disengaging positions, mechanism for operating the actuating means including an electric motor and a controlling switch, a turnable shaft, means connecting the shaft with the switch, and means to which a sharp impact is imparted by the pan during movement into registering position for turning the shaft and closing the switch thereby starting the motor and setting said mechanism in operation.

17. A machine of the character described comprising a presser head having dies, a pan movable into position beneath the presser head and having registerable dough pockets; in combination, actuating means for moving the presser head into engaging and disengaging positions, mechanism for operating the actuating means including an electric motor and a controlling switch, a turnable shaft having an arm in connection with the switch, a second arm on the shaft having a pin, a bar in blow-imparting position in reference to the pin, and a lever connected with the bar having a portion projecting in the path of the pan which is struck by the pan in moving the pan into registering position thereby transferring the blow to said pin and turning the shaft to close the switch thereby starting the motor and setting said mechanism in motion.

18. A machine of the character described comprising a presser head having dies, a pan movable beneath the presser head having registerable dough pockets; in combination, actuating means for moving the presser head into engaging and disengaging positions, mechanism for operating the actuating means including an electric motor and a controlling switch therefor, a brake, means applying the brake keeping the mechanism from moving, a normally depressed latch, and means engaged by the pan upon movement into the foregoing registering position for accomplishing the following: extending the latch into locking position in respect to the pan, operating the brake applying means to release the brake and closing the switch to start the motor and to set said mechanism in operation.

19. A machine of the character described comprising a presser head having dies, a pan movable beneath the presser head having registerable dough pockets; in combination, actuating means for moving the presser head into engaging and disengaging position, mechanism for operating the actuating means including an electric motor and a controlling switch, a brake, means applying the brake keeping the mechanism from moving, a normally depressed latch, arms for the respective switch, brake applying means and latch, turnable means upon which the various arms have common mounting, and means engaged and shifted by the pan in moving the pan into the foregoing registering positions for turning said turnable means thereby operating the brake applying means to release the brake, closing the switch to start the motor and said mechanism and extending the latch into locking position in respect to the pan.

20. A machine of the character described comprising a presser head having dies, a pan movable beneath the presser head having registerable dough pockets; in combination, actuating means for moving the presser head into engaging and disengaging positions, mechanism for operating the actuating means including an electric motor and a controlling switch, a brake included in the mechanism having means applying the brake to keep said mechanism from motion, a latch normally depressed while the pan is being moved into position, arms of which two are respectively connected with the switch and the latch and a third has engagement with the brake applying means, a shaft upon which the arms have common fixed mounting, and means contacted and shifted by the pan when moving to the foregoing registering position to turn the shaft thereby extending the latch into locking position in respect to the pan, shifting the brake applying means to release the brake and closing the switch to start the motor and set said mechanism in motion.

21. A machine of the character described comprising a presser head having dies, a pan movable beneath the presser head having registerable dough pockets, mechanism for moving the presser head into impressing and release position, said mechanism including a gear having a crank pin, a rod resting upon the crank pin having a shoulder in position to obstruct the movement of the crank pin in its circular path, and means operated upon moving the pan to registering position to lift the rod from the crank pin and the shoulder out of the path of movement.

22. A machine of the character described comprising a presser head having dies, a pan movable beneath the presser head having registerable dough pockets, mechanism for lowering and raising the head into impressing and releasing position, said mechanism including a gear having a crank pin, a pivoted rod resting upon the crank pin having a shoulder in the path of its circular motion, a turnable element having an arm in position to engage the rod, and means operated upon moving the pan into the foregoing registering position for turning said element causing said arm to move the rod out of engagement with the crank pin and the shoulder out of said path of movement.

23. A machine of the character described comprising a presser head having dies, a pan movable beneath the presser head having registerable dough pockets, mechanism for moving said presser head into impressing and releasing positions, said mechanism including a revoluble gear having a crank pin and a brake drum, a brake band applied to the drum and having a lever, a rod connected with the lever resting upon the crank pin and having a shoulder with which the crank pin engages to hold the brake band in the applied position, and means operated upon movement of the pan to the foregoing registering position to lift the rod and displace the shoulder from the path of the crank pin permitting relaxation of the brake band and release of the brake drum.

24. A device of the character described comprising a presser head having dies, a pan movable beneath the presser head having registerable dough pockets, mechanism for operating the presser head including a revoluble gear having a crank pin which produces impressing and releasing movements of the presser head, a brake included in said mechanism having a brake band and a lever, a rod connected with the lever having a shoulder situated in the path of movement of the crank pin and being engaged thereby when the pin nears the end of the release movement to shift the rod and lever to apply the brake band.

25. A machine of the character described comprising a presser head having dies, a pan placed in position beneath the presser head having registerable dough pockets, mechanism for operating the presser head including a revoluble gear having a crank pin for causing movement of the presser head into impressing and release positions, a brake included in said mechanism having a band with an operating lever, a rod connected with the lever having a shoulder, a turnable element having an arm supporting the rod, a second arm on the shaft, means engaging said second arm holding said element in turn to hold said rod and means extending from said last means being engageable by the crank pin near the end of the release movement to release said second arm permitting turning of said element and dropping of the rod and shoulder into the path of the crank pin for engagement therewith by the crank pin to shift the lever and apply the brake band.

26. A machine of the character described comprising a presser head having dies, a pan placed in position beneath the presser head having registerable dough pockets, mechanism for operating the presser head including a gear having a crank pin for causing imprinting and release movements of the presser head, a brake drum included in the mechanism having a band with an operating lever, a rod connected with the lever having a shoulder, a turnable shaft having a pair of arms, a bar having a head with a shoulder engaging one of the arms thereby holding the shaft to support said rod by means of the other arm, and a tongue upon the head extending into the path of the crank pin for engagement thereby when nearing the end of the release movement permitting disengagement of the first arm from the shoulder of the head and turning of the shaft so that the second arm may drop the rod bringing the shoulder thereof into the path of the crank pin for shifting the brake rod and applying the brake band.

27. A machine of the character described comprising a presser head having dies, a pan placed beneath the presser head having registerable dough pockets, a span rod connected with the presser head, a crank rod having a crank engaging the span rod, manual means for operating the crank to depress the span rod and the presser head into an impressing position; in combination, a yoke loosely mounted upon the crank rod and engaging the span rod, mechanism connected with the yoke for depressing the span rod with the same result, and means operated by the pan when reaching said registering position for setting said mechanism in motion and operating the presser head without regard to said manual means.

MEYER COLLIS.